United States Patent
Paiam et al.

(10) Patent No.: US 7,027,732 B2
(45) Date of Patent: Apr. 11, 2006

(54) WDM CROSS-CONNECTS FOR CORE OPTICAL NETWORKS

(75) Inventors: Reza Paiam, Ottawa (CA); Ross Saunders, Ottawa (CA); Scott Marshall, Dunrobin (CA); Jonathan Bosloy, Kanata (CA)

(73) Assignee: PTS Corporation, San Jose, CA (US)

( * ) Notice: Subject to any disclaimer, the term of this patent is extended or adjusted under 35 U.S.C. 154(b) by 633 days.

(21) Appl. No.: 10/051,234

(22) Filed: Jan. 18, 2002

(65) Prior Publication Data

US 2003/0138252 A1    Jul. 24, 2003

(51) Int. Cl.
*H04B 10/00*    (2006.01)
(52) U.S. Cl. .......................... 398/50; 398/85
(58) Field of Classification Search ............ 398/82–88, 398/45–51
See application file for complete search history.

(56) References Cited

U.S. PATENT DOCUMENTS

| | | | | |
|---|---|---|---|---|
| 5,446,809 A | * | 8/1995 | Fritz et al. ..................... | 385/17 |
| 5,771,112 A | * | 6/1998 | Hamel et al. .................. | 398/83 |
| 6,466,341 B1 | * | 10/2002 | Lumish et al. ................ | 398/82 |
| 2001/0024542 A1 | | 9/2001 | Aina et al. | |

* cited by examiner

*Primary Examiner*—Agustin Bello

(57) ABSTRACT

An optical cross-connect switch is provided for routing optical data signals in an optical transport network. The optical cross-connect switch includes a plurality of signal splitters, where each signal splitter receives an optical multiplexed signal therein and operates to partition the optical multiplexed signal into a plurality of optical multiplexed signals; a plurality of wavelength selective devices connected to the plurality of signal splitters, such that a wavelength selective device is disposed at each output of each signal splitter and operates at different wavelengths to manipulate optical data signals embodied in the optical multiplexed signal; and a plurality of signal combiners connected to the plurality of wavelength selective devices, such that each signal combiner is adapted to receive an optical multiplexed signal via a wavelength selective device from each of the plurality of signal splitters, and operates to pass the optical multiplexed signal to an outlet port of the switch, thereby routing optical data signals amongst the outlet ports of the switch.

12 Claims, 20 Drawing Sheets

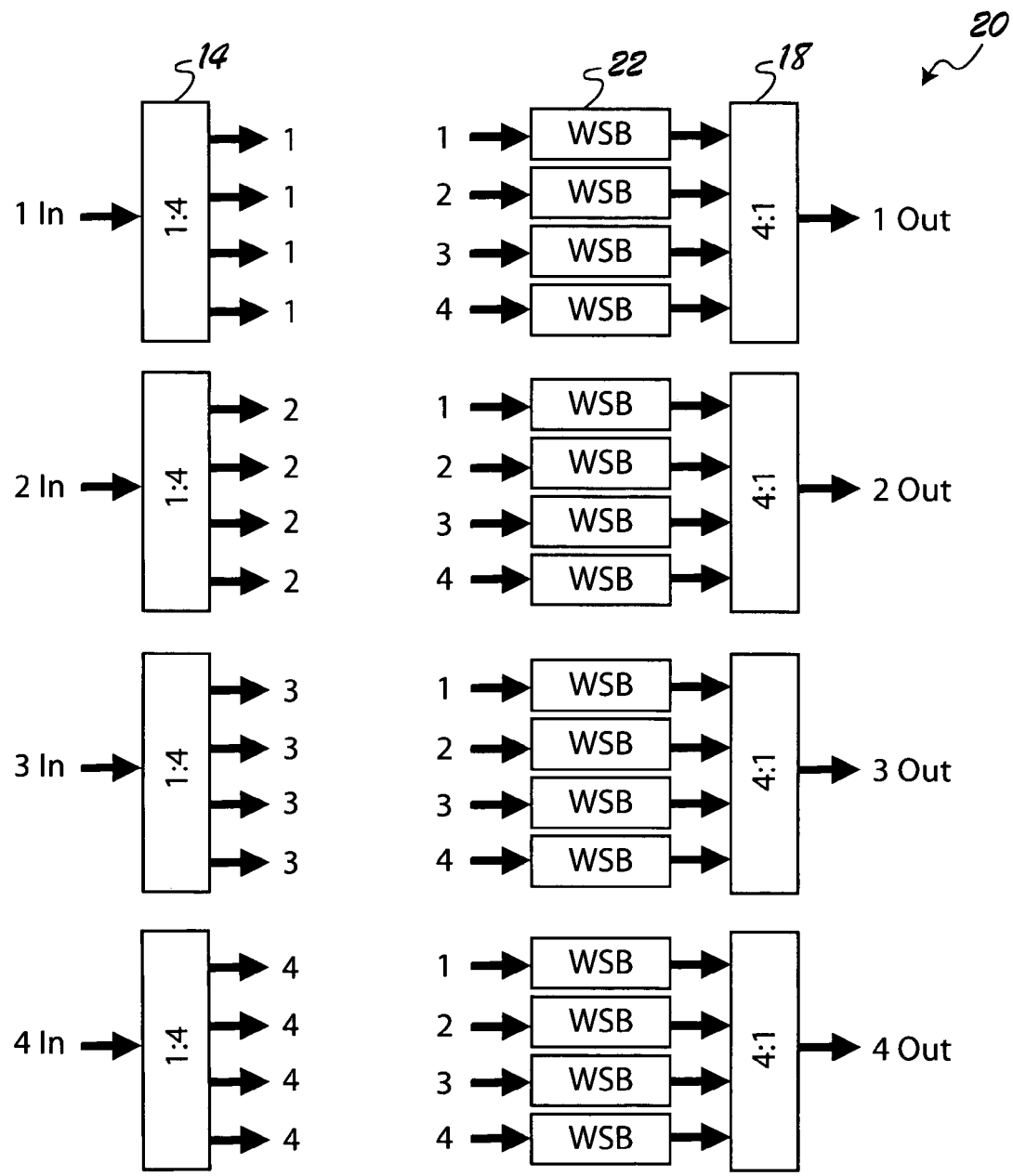
IFig-2A

WDM CROSS-CONNECTS FOR CORE OPTICAL NETWORKS

FIELD OF THE INVENTION

The present invention relates generally to cross-connect switches and, more particularly, to an architectural arrangement for an optical cross-connect switch residing in a core optical transport network.

BACKGROUND OF THE INVENTION

There is considerable interest today in cross-connect switches for use in optical transport networks. Cross-connect switches are capable of routing different wavelength channels along different routes within the network. To do so, cross-connect switches typically employ various active wavelength network components. The use of active wavelength network components enables the reconfiguration of the networks in order to meet the changing network traffic demands and service requirements.

Conventional cross-connect switches typically work on a single bit rate. However, it would be highly beneficial if optical cross-connect switches could simultaneously operate on wavelength channels having different bit rates. In addition, it is important that cross-connect switches provide some degree of redundancy and protection switching in order to increase reliability and robustness of the network. Therefore, it is desirable to provide several architectural arrangements for cross-connect switches which address these as well as other network requirements.

SUMMARY OF THE INVENTION

In accordance with the present invention, an optical cross-connect switch is provided for routing optical data signals in an optical transport network. The optical cross-connect switch includes a plurality of signal splitters, where each signal splitter receives an optical multiplexed signal therein and operates to partition the optical multiplexed signal into a plurality of optical multiplexed signals; a plurality of wavelength selective devices connected to the plurality of signal splitters, such that a wavelength selective device is disposed at each output of each signal splitter and operates at different wavelengths to manipulate optical data signals embodied in the optical multiplexed signal; and a plurality of signal combiners connected to the plurality of wavelength selective devices, such that each signal combiner is adapted to receive an optical multiplexed signal via a wavelength selective device from each of the plurality of signal splitters, and operates to pass the optical multiplexed signal to an outlet port of the switch, thereby routing optical data signals amongst the outlet ports of the switch.

For a more complete understanding of the invention, its objects and advantages, reference may be had to the following specification and to the accompanying drawings.

BRIEF DESCRIPTION OF THE DRAWINGS

FIG. 2A is a block diagram of architectural arrangements for an optical cross-connect switch that employs wavelength selective blockers in accordance with the present invention;

DETAILED DESCRIPTION OF THE PREFERRED EMBODIMENTS

Figure 1:
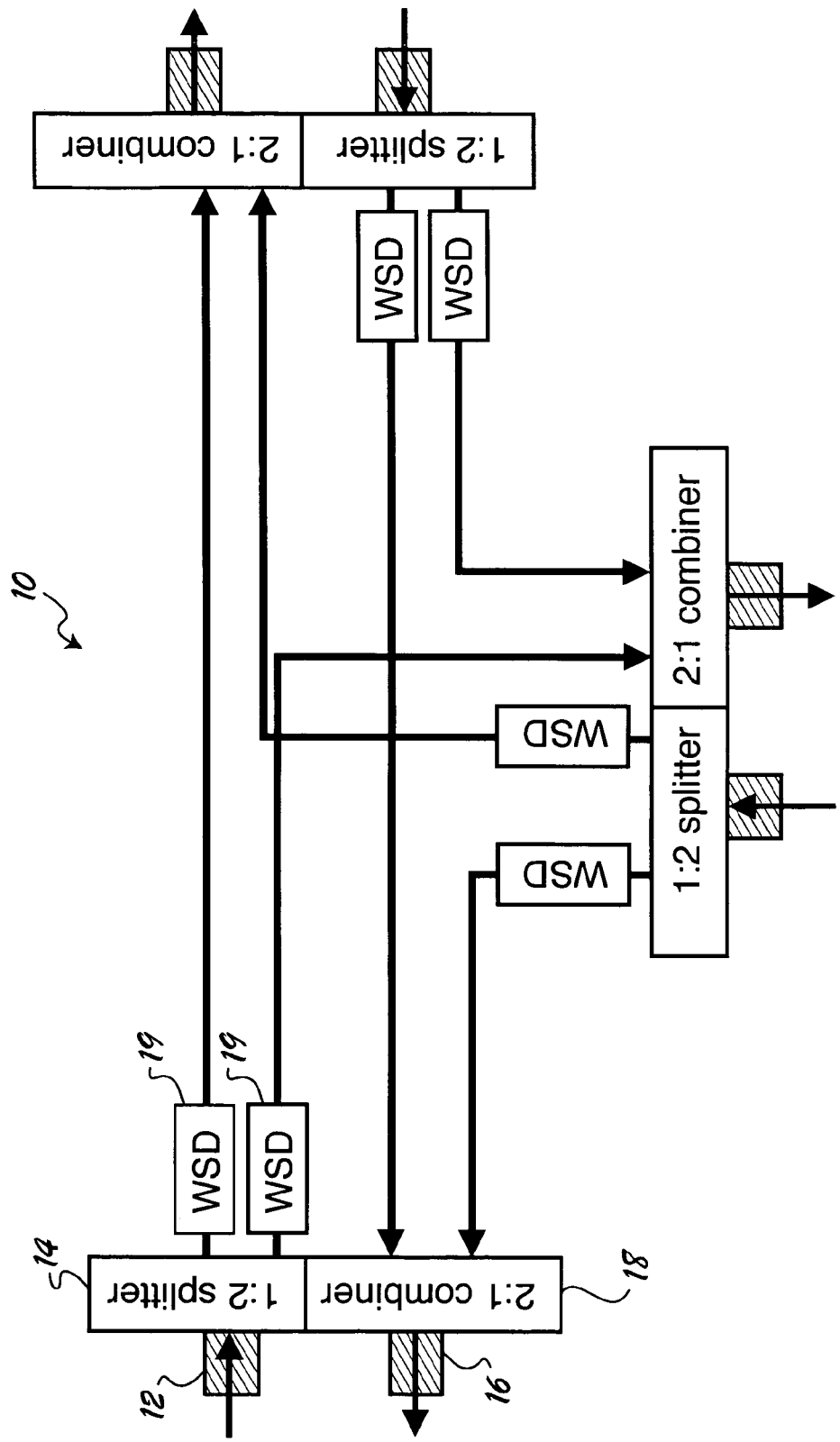
FIG. 1 is a block diagram of an architectural arrangement for an optical cross-connect switch in accordance with the present invention.

FIG. 1 illustrates an architectural arrangement for an optical cross-connect switch 10 which may be used in a wavelength division multiplexing (WDM) optical transport network. The cross-connect switch 10 provides ports to receive two or more fiber optic cables, where each fiber optic cable carries an optical data signal therein. In a preferred embodiment, the switch 10 may be adapted to receive fiber pairs. In this case, each port is further defined to include an inlet port 12 for receiving an optical data signal and an outlet port 16 for transmitting an optical data signal. Such ports will be herein referred to as "complementary ports".

In a WDM optical transport network, numerous optical data signals are multiplexed together to form a single optical system signal. The optical system signal may be constituted in an optical line hierarchy as is known in the art. For example, the optical system signal may be constructed from a plurality of optical band signals, where each of the optical band signals is constructed from a plurality of optical sub-band signals and each of the optical sub-band signals are constructed from a plurality of optical wavelength signals. It is readily understood that an optical wavelength signal may embody a plurality of channel signals that are multiplexed together electrically. Although the optical cross-connect switch 10 is preferably used to route optical wavelength signals, it is readily understood that the cross-connect switches of the present invention may support routing of optical data signals at any one of the hierarchical layers that form an optical system signal. Optical band signals, optical sub-band signals and optical wavelength signals are herein referred to as optical multiplexed signals.

For illustration purposes, a three-way cross-connect switch 10 that does not support loop-back capability is shown in FIG. 1. The optical cross-connect switch 10 is operable to route optical multiplexed signals amongst any of the fiber pairs connected thereto. To do so, a signal splitter 14 is connected to each of the input ports 12 of the cross-connect switch 10. Each signal splitter 14 partitions an optical multiplexed signal received therein into a plurality of optical multiplexed signals. The plurality of optical multiplexed signals output by each signal splitter 14 are in turn routed to a different outlet port 16 in the cross-connect switch 10. It is readily understood that the cross-connect switch 10 may be designed to support more or less than three inlet ports.

To accommodate routing of optical multiplexed signals, wavelength selective devices 19 are connected to each of the signal splitters 14. The number of wavelength-selective devices employed by the cross-connect switch is N*(N−1), where N is the number of fiber pairs supported by the switch. In this example, the number of wavelength-selective devices 19 employed by the switch 10 is six.

Wavelength selective devices 19 are preferably implemented using either wavelength selective blockers or wavelength selective switches. A wavelength selective blocker is a 2-port device. In operation, an optical multiplexed signal is received into the input port of the wavelength selective blocker. The wavelength selective blocker is then operable to selectively block transmission of channels or pass through channels within the optical multiplexed signal to its output port.

On the other hand, a wavelength selective switch is a device having more than two ports. In operation, the wavelength selective switch may receive optical multiplexed signal(s) into one or more input ports. The wavelength selective switch is then operable to route the optical multiplexed signals amongst two or more output ports associated with the device.

Wavelength selective devices are operable to manipulate the optical data signals embodied in an optical multiplexed signal. In other words, wavelength selective devices can be characterized as devices that operate on data signals transmissible at two or more (but preferably more than four) wavelengths. Such devices are commercially available from various optical component manufacturers, including Corning, JDS Uniphase, Network Photonics, and Avanex. Some of these wavelength selective devices may also be operable to partially attenuate the optical signals passing therethrough. As will be further described below, various arrangements of wavelength selective blockers and/or wavelength selective switches may be used to implement a cross-connect switch.

Output from each of the wavelength selective devices 19 is then routed to one of a plurality of signal combiners 18. In particular, a signal combiner 18 is disposed at each outlet port 16 of the cross-connect switch 10. With the exception of the complementary inlet port, each signal combiner 18 is adapted to receive an optical signal from each of the inlet ports 12. It is readily understood that signal splitters and signal combiners may be variable to automatically adjust the optical power of the optical signals passing therethrough. In this way, the cross-connect switch 10 is operable to route optical multiplexed signals amongst the outlet ports 16 of the switch.

In a first preferred embodiment, only wavelength blockers are used to implement a cross-connect switch. In a simplistic form, the cross-connect switch may employ 1:(N−1) signal splitters and signal combiners, where N is the number of fiber pairs supported by the switch. A wavelength blocker device is then positioned at each output of each signal splitter. The wavelength selective blockers cooperatively operate to route the incoming optical multiplexed signals amongst the different outlet ports of the switch. It should be noted that such an arrangement does not support loop-back capability.

Figure 2B:
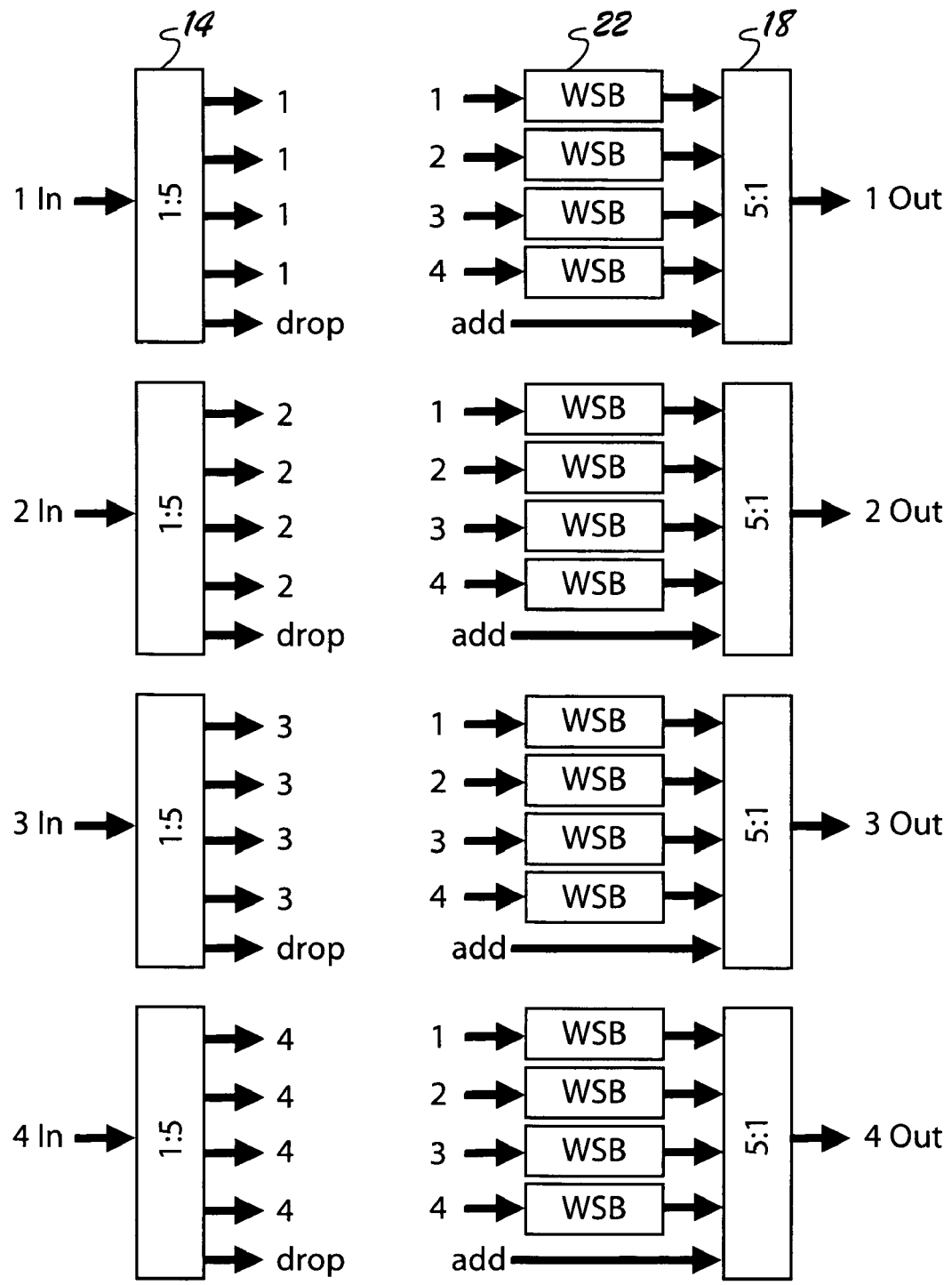
FIG. 2B is a block diagram of architectural arrangements for an optical cross-connect switch that employs wavelength selective blockers and supports signal add/drop functionality in accordance with the present invention.

Referring to FIG. 2A, a cross-connect switch 20 with loop-back capability preferably employs 1:N signal splitters and N:1 signal combiners, where N is the number of fiber pairs supported by the switch. In this form, each signal combiner 18 is adapted to receive an optical signal from each of the inlet ports 12, including its complementary inlet port. A wavelength blocker device 22 is interposed between each output of each signal splitter 14 and each input of each signal combiner 18. In an alternative form, the cross-connect switch may employ 1:(N+1) signal splitters and signal combiners, where N is the number of fiber pairs supported by the switch. The additional port associated with each signal splitter and signal combiner may be used to support signal add/drop functionality as shown in FIG. 2B. To simplify the figures, optical paths between the signal splitters 14 and the wavelength blocker devices 22 are not fully drawn. Rather, each optical signal path is denoted by a number indicative of the corresponding inlet port of the switch.

One skilled in the art will readily recognize that these architectural arrangements for optical cross-connect switches support signal broadcast capability. For instance, when using wavelength selective blockers, each output gets a copy of each incoming signal. Thus, an incoming signal may be selectively broadcast to one or more of the output ports of the switch. Similarly, an incoming signal may be selectively broadcast to the local drops of the switch.

Prior to broadcasting an incoming signal to a particular output port, it may be necessary to convert the signal to a different transmission wavelength. For example, it may be desirable to broadcast an incoming signal transmitted at $\lambda 1$ to all of the output ports. However, $\lambda 1$ may not be available on a given output fiber. Thus, the signal needs to be converted to a different transmission wavelength before sending it to the output fiber. In this case, a wavelength converter may be used as shown in FIG. 9C. The wavelength converter may be tuned to receive the signal transmitted at $\lambda 1$. The wavelength converter converts the data to a different transmission wavelength and then sends the converted signal to the applicable output port.

Figure 3A:
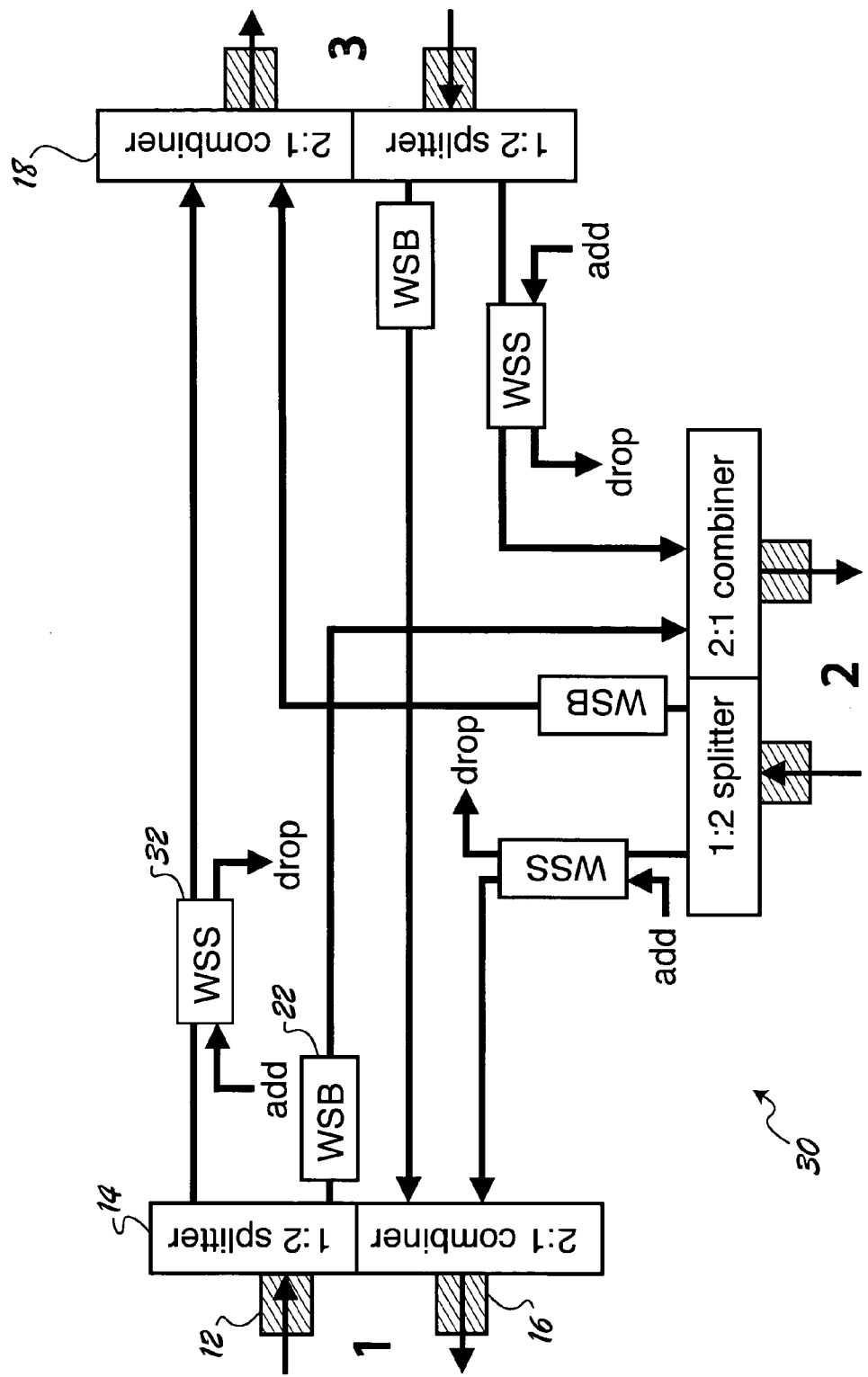
FIGS. 3A and 3B are block diagrams of an architectural arrangement for an optical cross-connect switch that supports signal add/drop functionality in accordance with the present invention.

In an alternative preferred embodiment, a cross connect switch 30 may avoid the additional ports on the signal splitters and signal combiners through the use of wavelength selective switches as shown in FIG. 3A. Each signal splitter 14 is connected to an input of at least one wavelength selective switch 32, such that the additional input of the wavelength selective switch 32 may be used to add an optical signal. Similarly, each signal combiner 18 is connected to an output of at least one wavelength selective switch 32. The additional output of the wavelength selective switch 32 may be used to drop an optical signal. The wavelength selective blockers 22 and the wavelength selective switches 32 cooperatively operate to route the incoming optical signals amongst the different outlet ports of switch 30. Although the depicted cross-connect switch 30 does not support loop-back capability, it is readily understood that the switch may be modified to support loop-back capability.

Figure 3B:
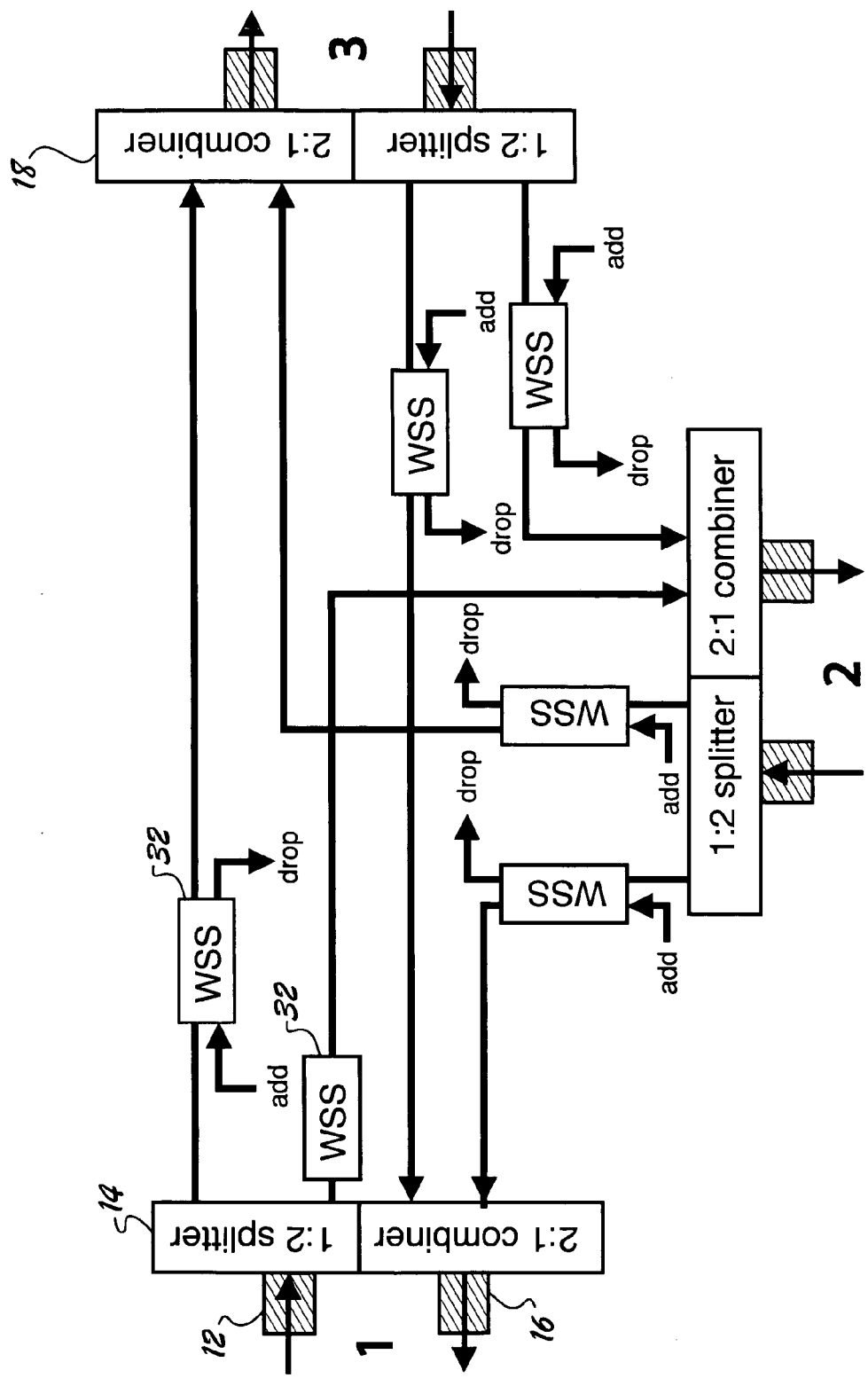

Redundant add/drop points are provided by introducing additional wavelength selective switches for each inlet port supported by the switch as shown in FIG. 3B. For instance, a second wavelength selective switch may be introduced for each inlet port. The failure of one of two wavelength selective switches for a given inlet port will not prohibit adding/dropping optical signals for that port.

Figure 4B:
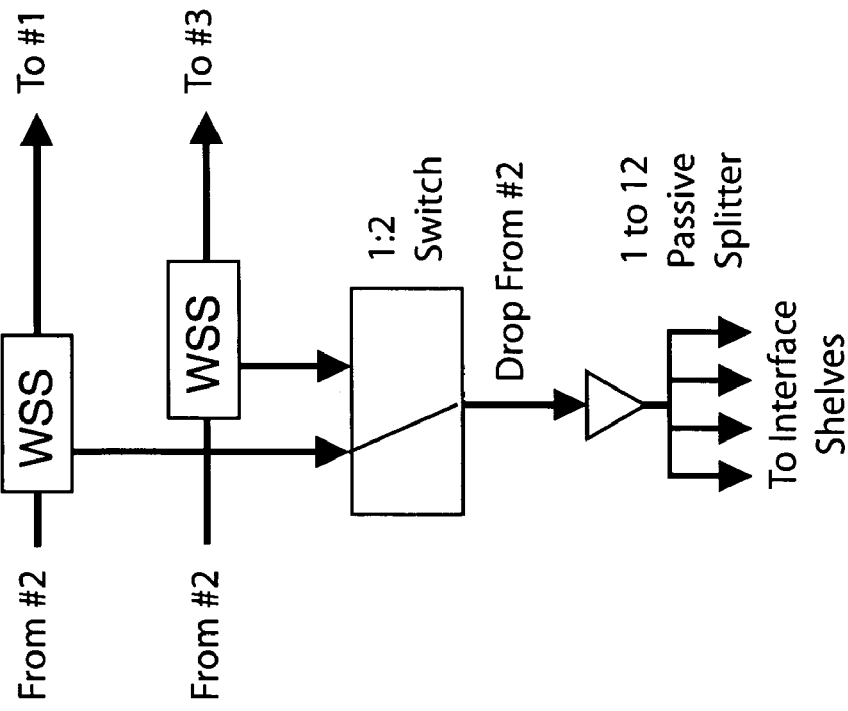
FIGS. 4A and 4B are block diagrams illustrating how redundant signal add/drop functionality may be integrated into the architectural arrangement of the present invention.
Figure 4A:
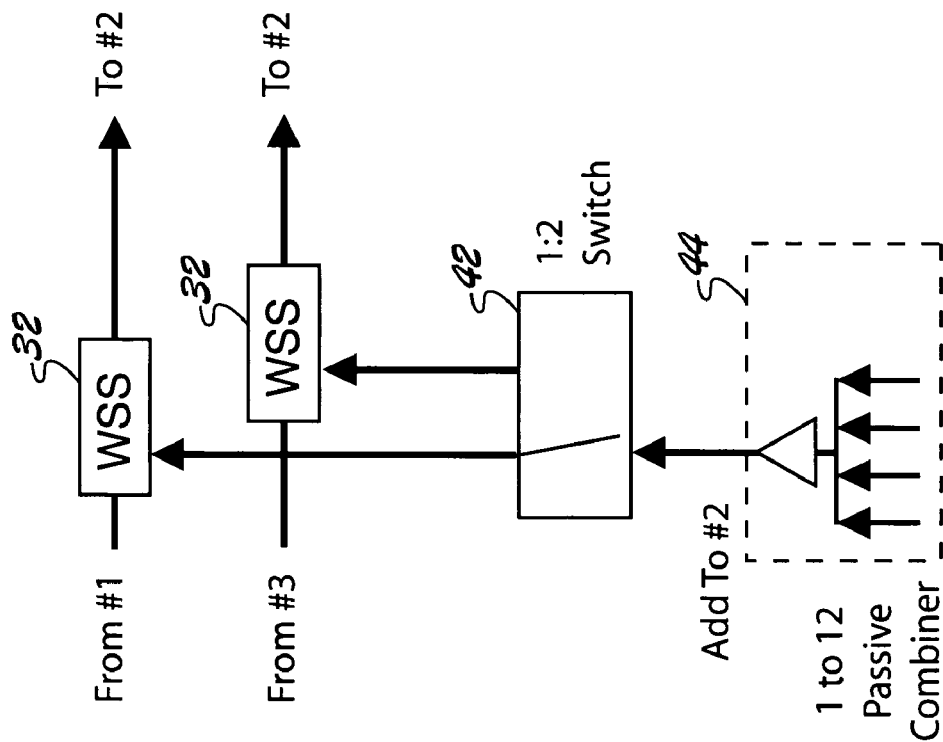

FIGS. 4A and 4B illustrates an exemplary technique for implementing redundant add/drop functionality. In FIG. 4A, an optical switch 42 is interposed between a signal source 44 and two wavelength selective switches 32. In operation, the two-way switch 42 routes an optical signal from the signal source 44 to one of the two wavelength selective switches 32. If one of the two wavelength selective switches fails, then the 2-way switch 42 is used to route the optical data signal to the other wavelength selective switch 32. It is to be understood that pass-through traffic may be lost on the failed wavelength selective switch 32. A similar technique may be used to drop an optical signal as shown in FIG. 4B. It should be noted that this technique does not support broadcast capability, unless the wavelength selective switches can broadcast an incoming signal to multiple output ports of the switch.

Figure 5A:
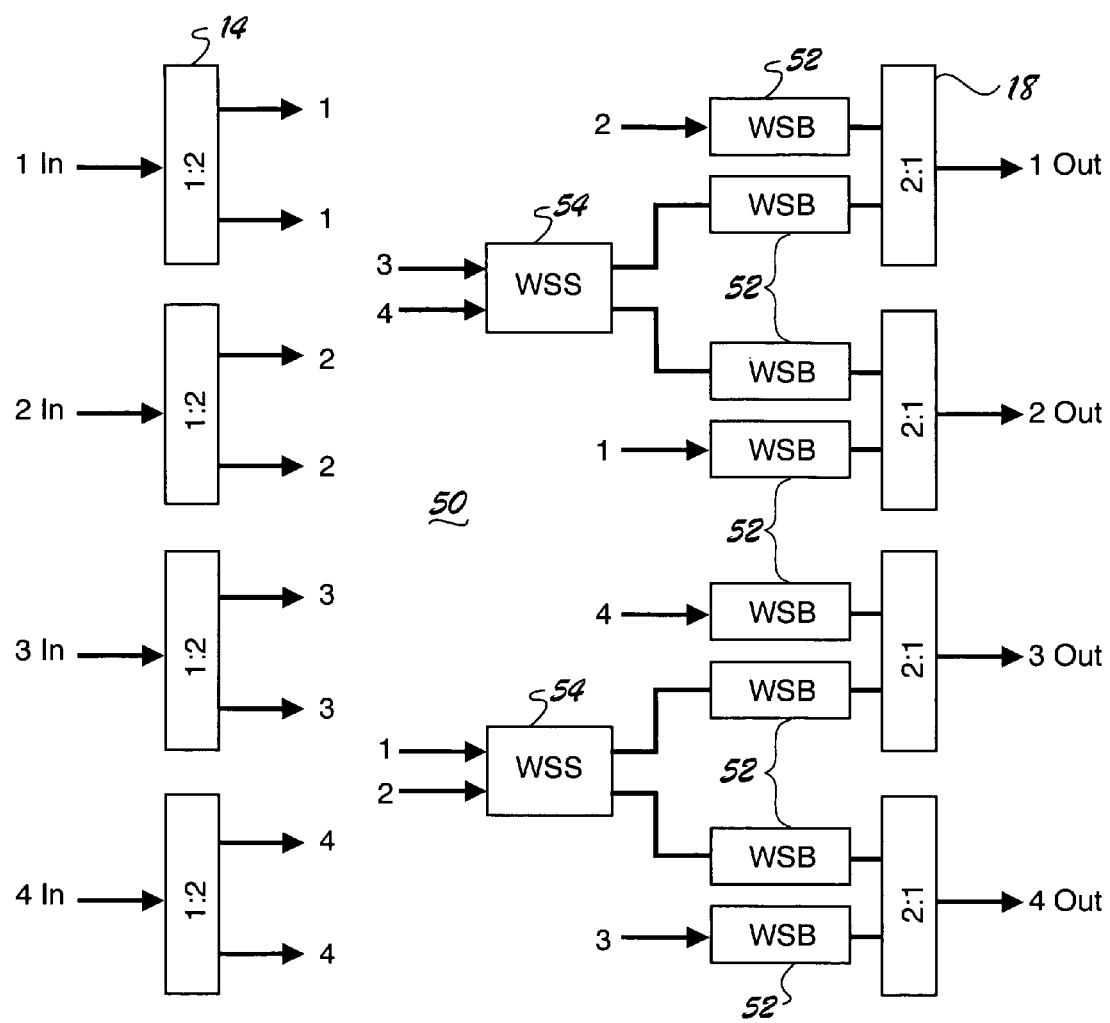
FIGS. 5A–5C are block diagrams of architectural arrangements for an optical cross-connect switch that reduces the number of wavelength selective devices in accordance with the present invention.

The number of wavelength selective devices employed by the cross-connect switch may be reduced using a cascading arrangement in FIG. 5A. In this arrangement, a wavelength selective blocker 52 is disposed at an input to each of the signal combiners 18. Two wavelength selective switches 54 are then interposed between the signal splitters 14 and the plurality of wavelength selective blockers 52. More specifically, one output from each signal splitters 14 is connected to the inputs to the wavelength selective switches 54. Outputs from the wavelength selective switches 54 are in turn connected to one of the wavelength selective blockers 52 at each of the signal combiners 18. In this way, one wavelength selective switch is used to replace two wavelength selective blockers.

In FIG. 5A, the four-way cross-connect switch 50 employs ten (10) wavelength selective devices. Generally, the required number of wavelength selective blockers in this arrangement may be characterized as N*(N/2) for an even number of fiber pairs and ((N+1)*(N/2))−1 for odd number of fiber pairs, where N is the number of fiber pairs supported by the switch 50. The required number of wavelength selective switches is $\lceil (N/2) \rceil * \lceil (N/2)-1 \rceil$, where N is the number of fiber pairs supported by the switch and the ceiling function $\lceil x \rceil$ is defined as the smallest integer greater or equal than x.

Figure 5B:
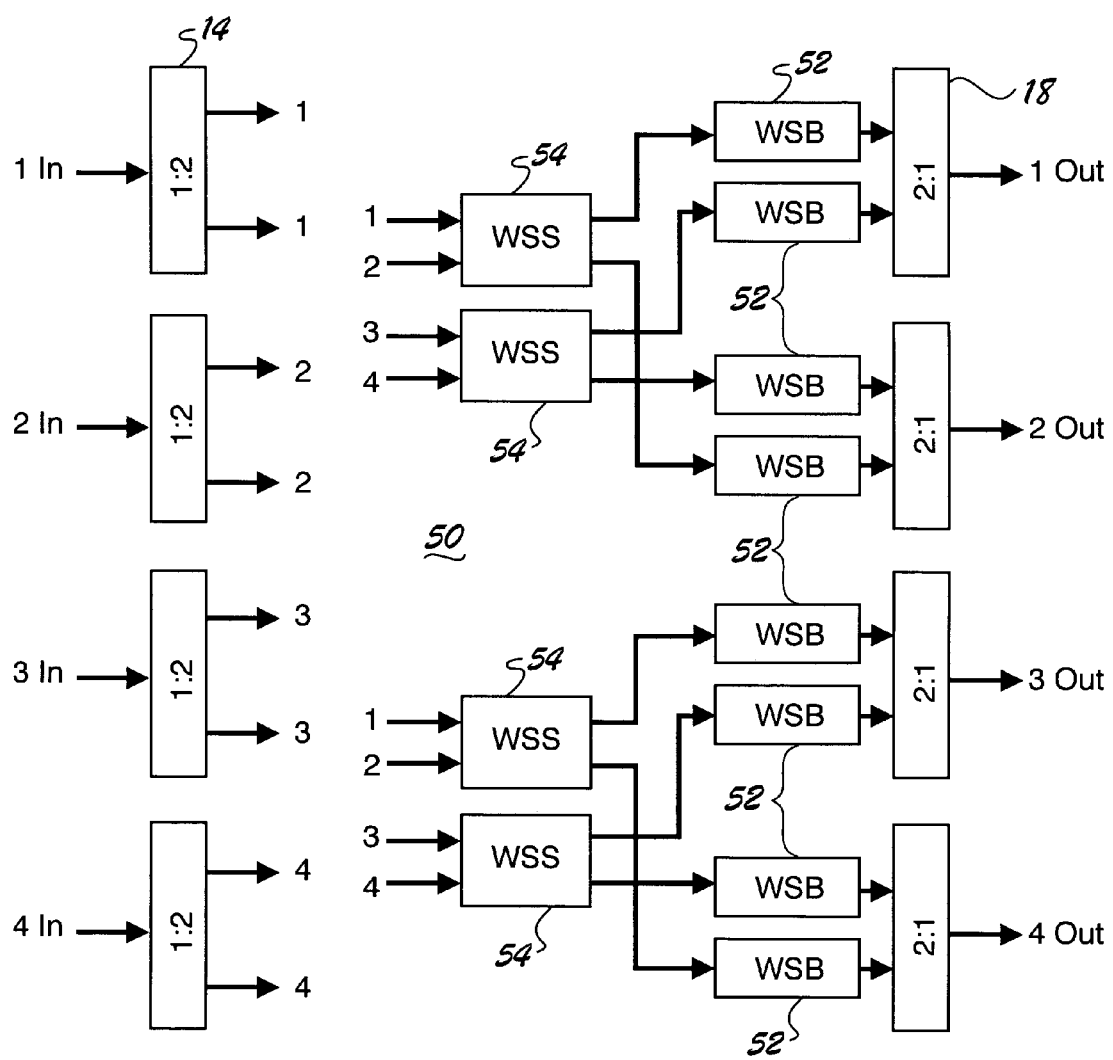

This arrangement is extendable to cross-connect switches that provide loop-back capability as shown in FIG. 5B. In this case, the number of wavelength selective blockers may be characterized as $N*\lceil N/2 \rceil$ and the number of wavelength selective switches may be characterized as $\lceil (N/2) \rceil * \lceil (N/2) \rceil$, where N is the number of fiber pairs supported by the switch and the ceiling function $\lceil x \rceil$ is defined as the smallest integer greater or equal than x. It is readily understood that these arrangements are further extendable to cross-connect switches that support more or less than four fiber pairs. It should also be understood that these arrangements do not support broadcast capability, unless the wavelength selective switches can broadcast an incoming signal to multiple output ports of the switch.

Figure 5C:
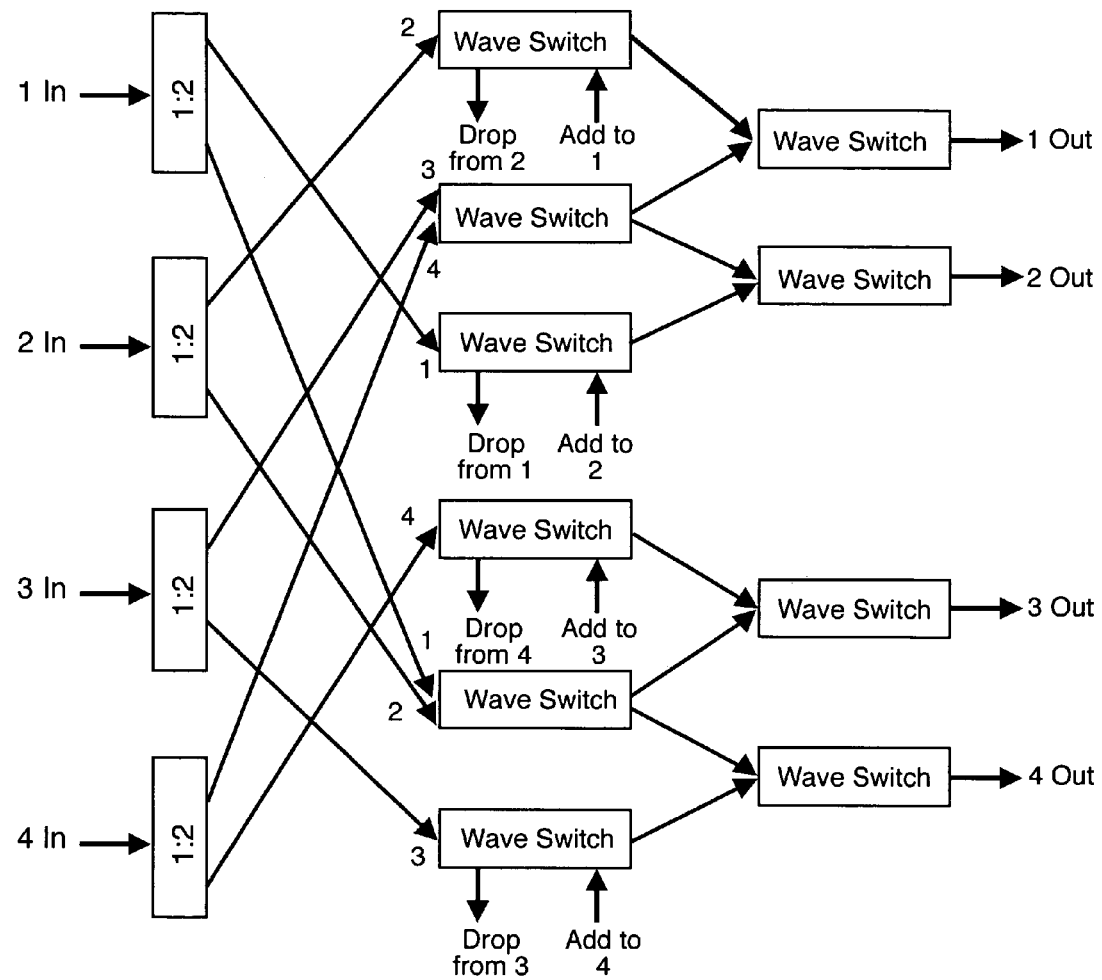

FIG. 5C illustrates another cascading arrangement that reduces the number of wavelength selective devices. In this arrangement, wavelength selective switches are employed without the need for signal combiners prior to the output ports of the switch. Although this arrangement offers lower pass-through loss than some of the other embodiments, it should be noted that the switch does not support loop-back capability and provides limited scalabilty without increasing the number of cascading stages.

Figure 6A:
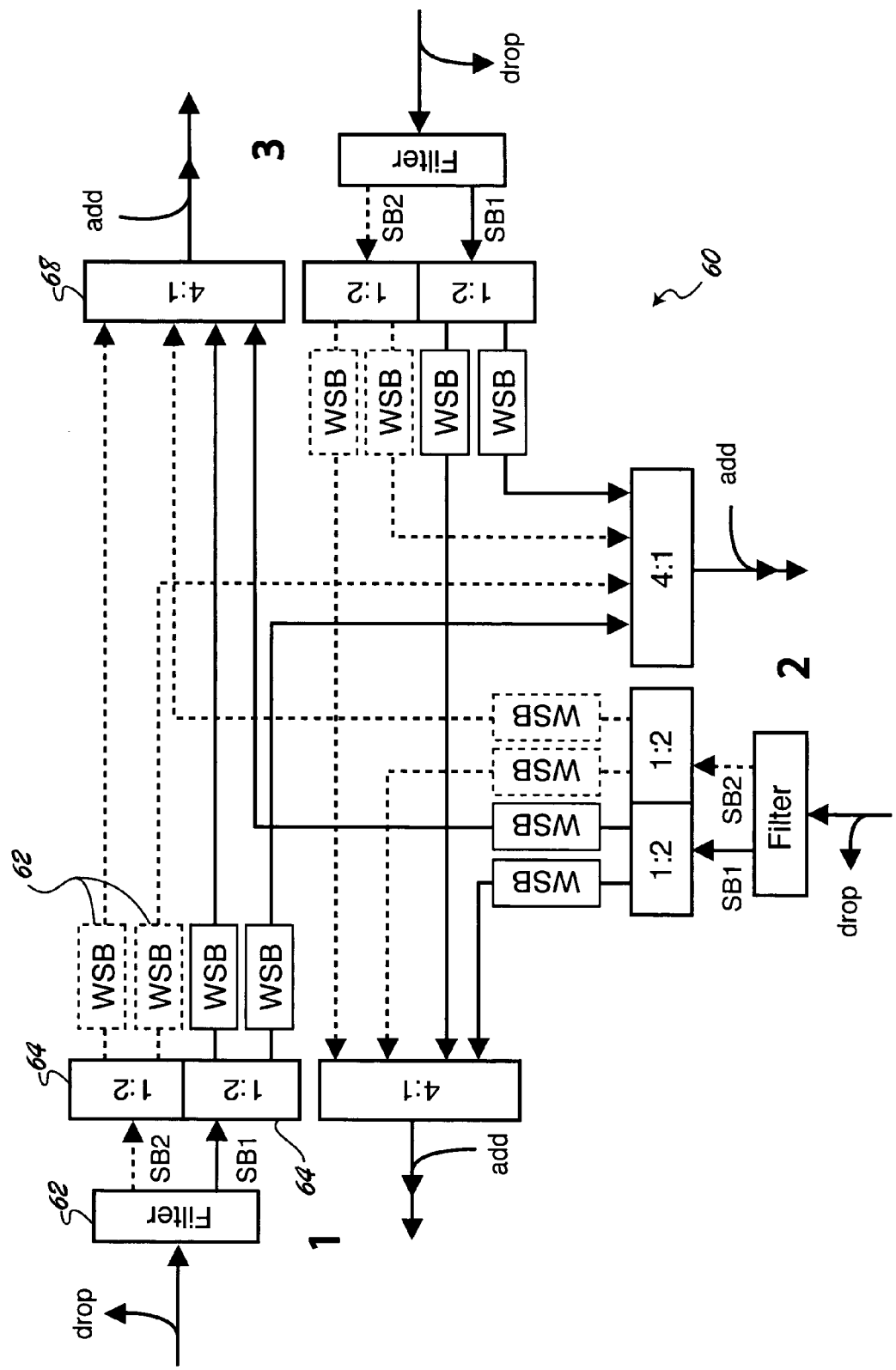
FIGS. 6A–6D are block diagrams of architectural arrangements for an optical cross-connect switch that support optical data signals having different bit rates in accordance with the present invention.

FIG. 6A illustrates an architectural arrangement for a cross-connect switch 60 that supports optical multiplexed signals having different bit rates. For illustration purposes, the optical spectrum of an optical band signal may be divided into two sub-bands: SB1 and SB2. The first sub-band having optical data signals transmitted at a bit rate of 10 Gb/s and the second sub-band having optical data signals transmitted at a bit rate of 40 Gb/s. A filter 62 is positioned at each inlet port of the switch. The filter 62 is operable to partition the optical band signal into two optical sub-band signals as is well known in the art. As tunable sub-band filters are currently not available, fixed filters are employed (e.g., 75% 10 Gb/s /25% 40 Gb/s; 50% 10 Gb/s /50% 40 Gb/s). Although only two sub-bands are described above, it is readily understood that the optical band signal may embody three or more optical sub-bands. To accommodate additional optical sub-bands, the single filter 62 may be suitably replaced with a combination of multiple filters. Likewise, it is to be readily understood that other bit rates may be supported by the switch 60.

The optical sub-band signals are then directed to two signal splitters 64. Each signal splitter 64 partitions the optical sub-band signal received therein into a plurality of optical sub-band signals. Each of the optical sub-band signals are in turn routed through a wavelength selective device 66. Since the wavelength selective devices 66 are configured to operate at one bit rate, the number of required wavelength selective devices 66 is twice the number employed by the cross-connect switch that supports a single bit rate. In this example, the three-way switch employs twelve (12) wavelength selective devices. The wavelength selective devices 66 may be either wavelength blockers, wavelength-selective switches or some combination thereof.

Figure 6B:
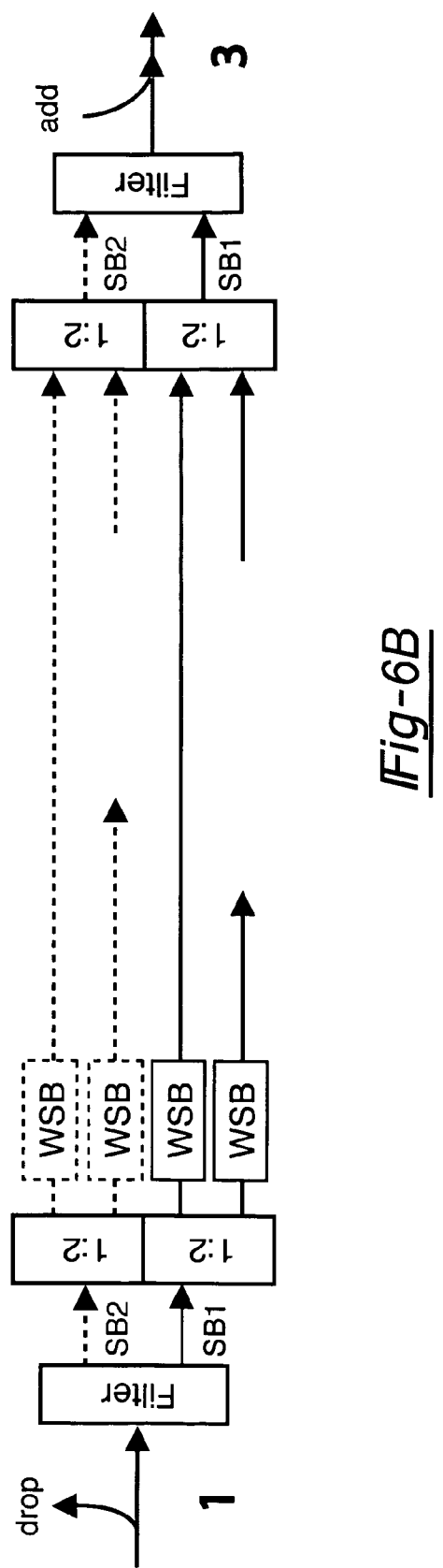

Output from each of the wavelength selective devices 66 is then routed to one of a plurality of signal combiners 68. Each signal combiner 68 is adapted to receive two optical sub-band signals having different bit rates from each of the inlet ports of the switch and operable to combine incoming signals to form an outgoing optical multiplexed signal. In order to improve multipath interference, it is envisioned that two signal combiners may be disposed at each outlet port of the cross-connect switch as shown in FIG. 6B. In this case, a second filter is adapted to receive the signals output by the two signal combiners. To simplify the figure, only one inlet and outlet port is shown for the switch.

Figure 6C:
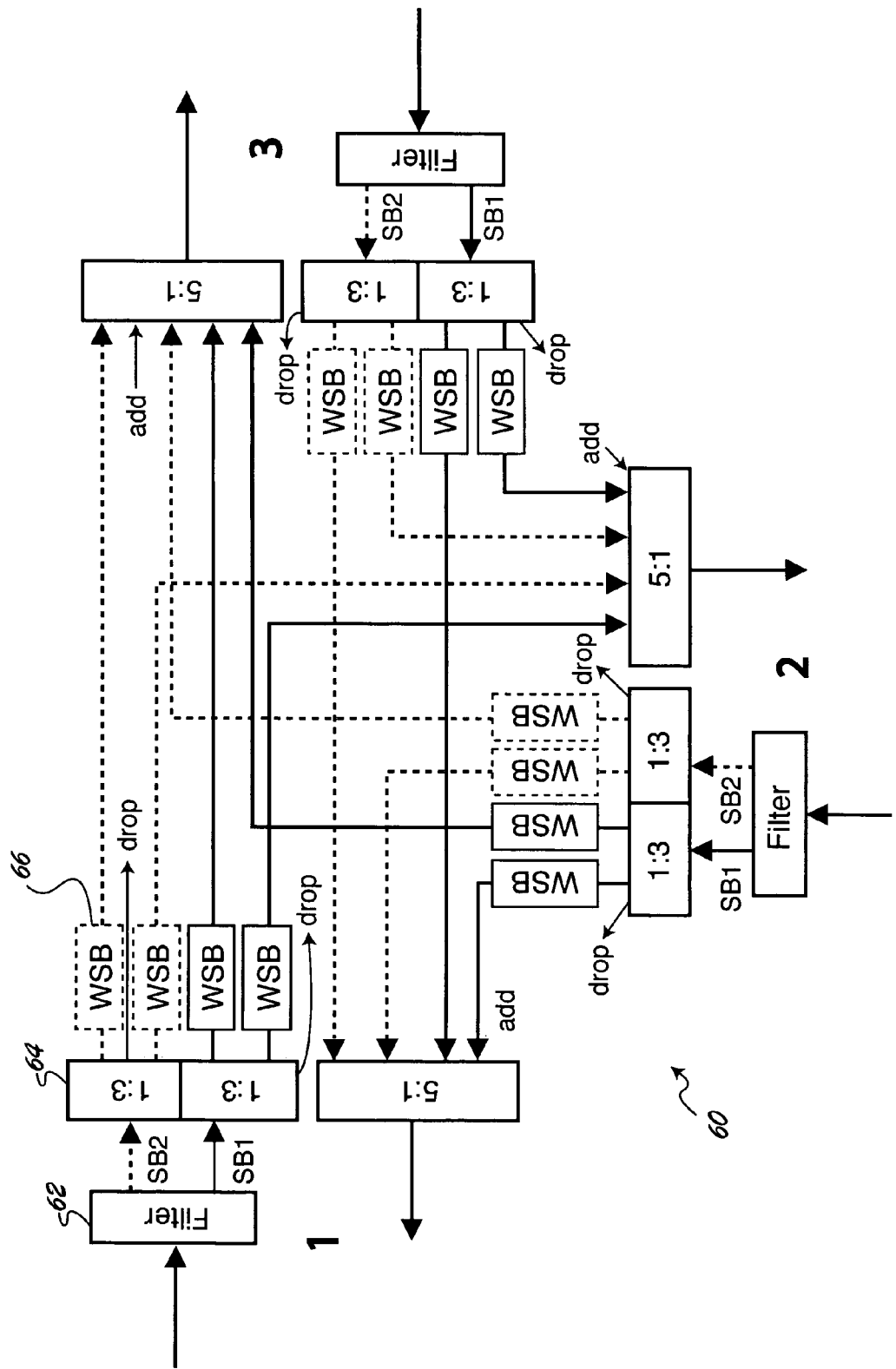
Figure 6D:
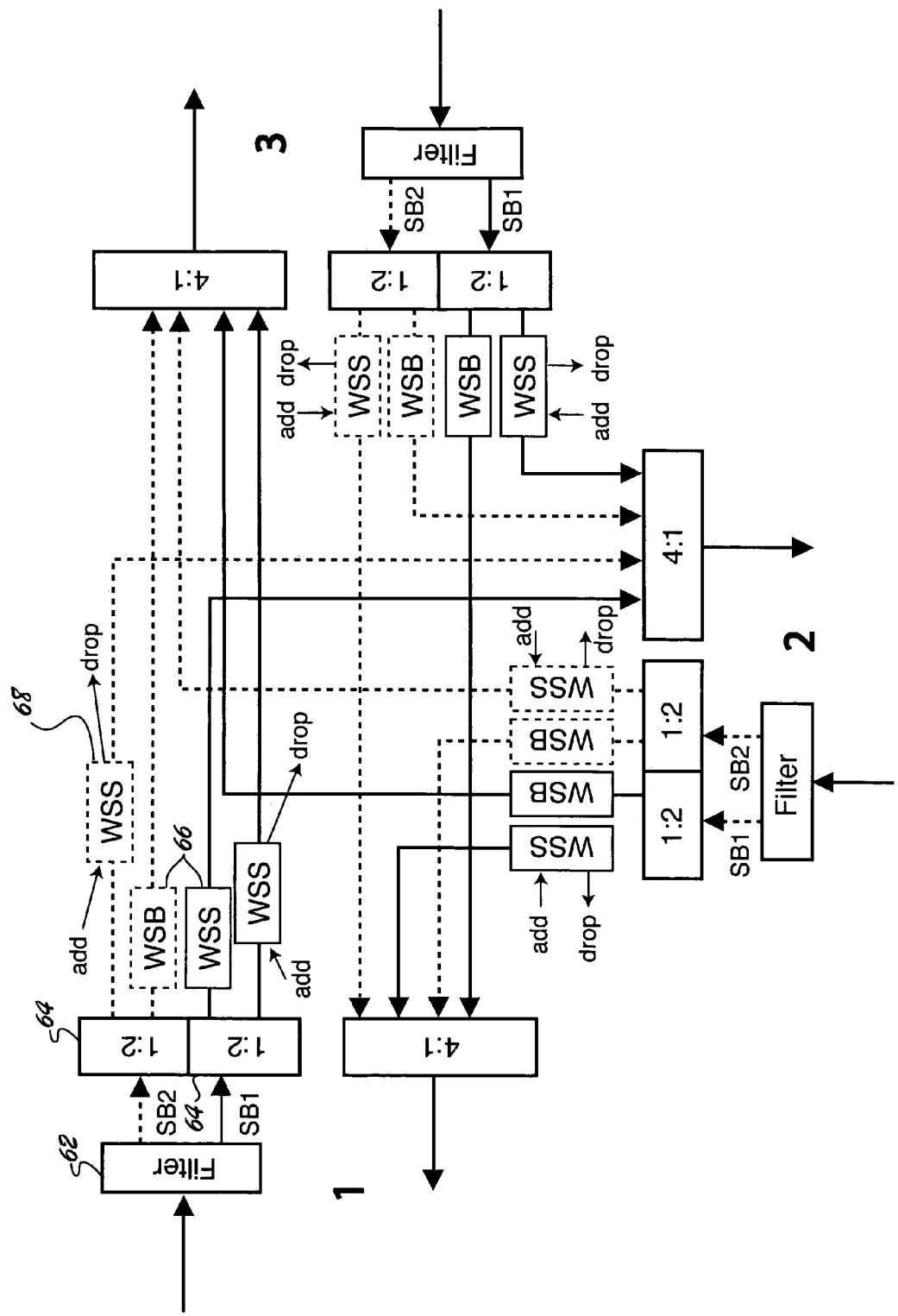

Each of the configurations set forth above are equally applicable to this embodiment. For instance, signal add/drop functionality may be provided via the signal splitters/combiners as shown in FIG. 6C. Alternatively, signal add/drop functionality may be supported through the use of wavelength selective switches as shown in FIG. 6D. One skilled in the art will readily recognize that these various arrangements are further extendable to cross-connect switches that support more or less than three fiber pairs.

Figure 7:
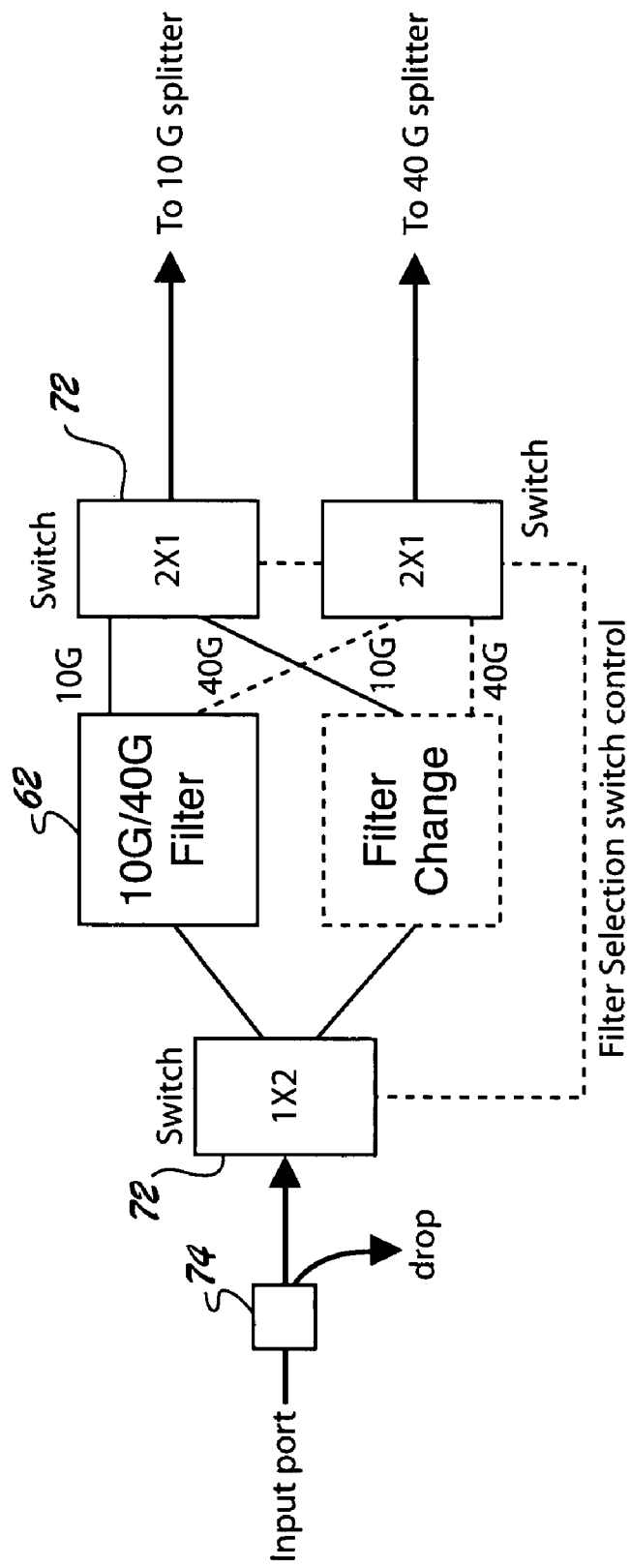
FIG. 7 is block diagram illustrating a switching arrangement that may be employed in the optical cross-connect switches of the present invention.

Additionally, the fixed filter 62 in any of these embodiments can be replaced with the arrangement shown in FIG. 7. Two-way switches 72 disposed on each side of the filter 62 enable it to be changed with minimal service disruption.

It is also envisioned that an optical band signal may be dropped via an additional two-way splitter 74 prior to the switching arrangement described above. Likewise, an optical band signal may be added after the cross-connect switch via an additional two-way combiner (not shown).

Figure 8:
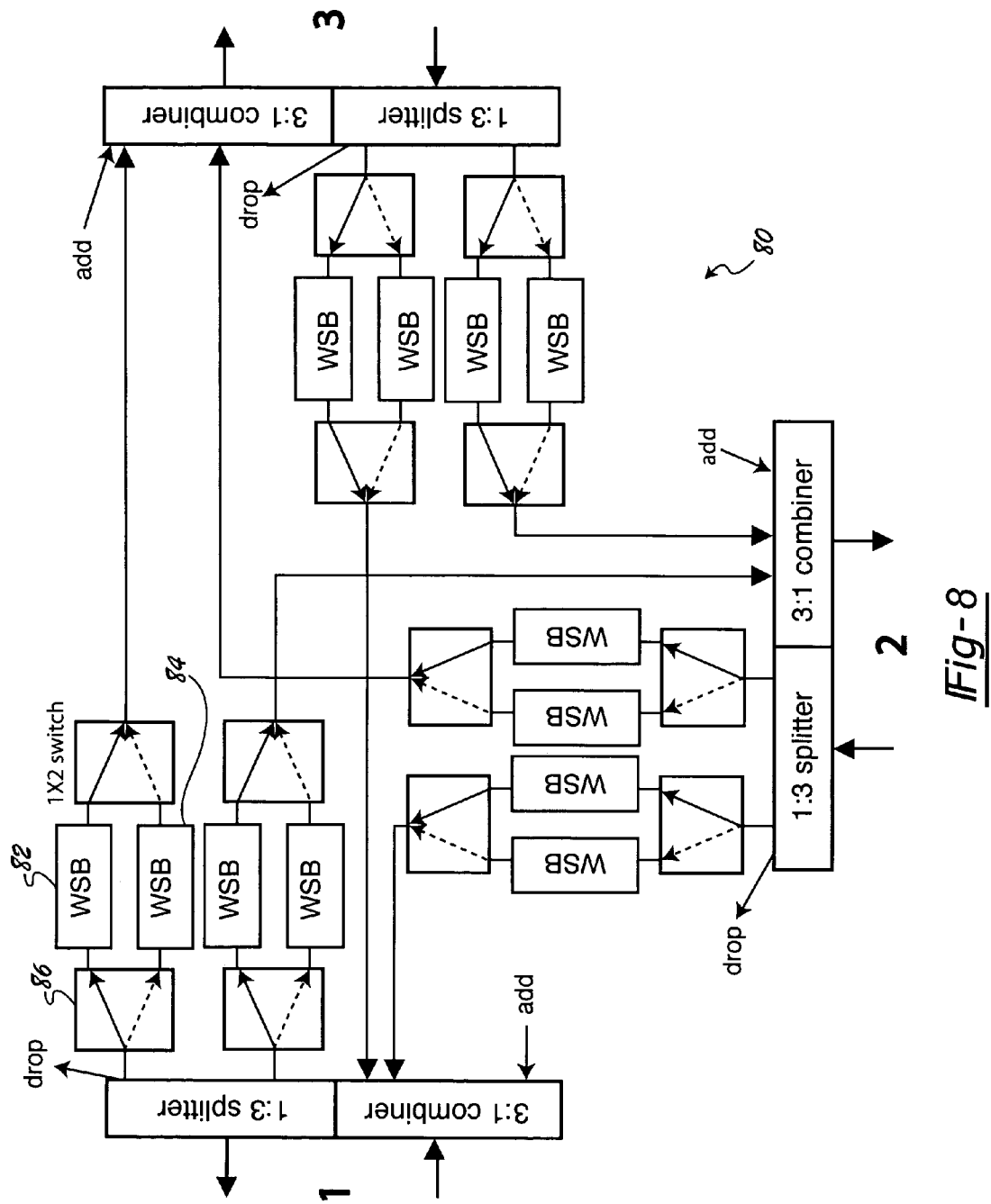
FIG. 8 is a block diagram of an alternative architectural arrangement for an optical cross-connect switch that supports optical data signals having different bit rates in accordance with the present invention.

An alternative architectural arrangement for a cross-connect switch 80 that supports optical multiplexed signals having different bit rates is shown in FIG. 8. In this embodiment, the wavelength selective devices 82 are designed to operate at two different bit rates as is known in the art. For instance, the device may operate at 10 Gb/s bit rate for part of the wavelength spectrum and at 40 Gb/s bit rate for the remaining part of the wavelength spectrum. In this way, the number of required wavelength selective devices 82 is the same as the cross-connect switch that supports a single bit rate. In other words, a three-way switch only need to employ six (6) wavelength selective devices. Again, the wavelength selective devices 82 may be either wavelength blockers, wavelength-selective switches or some combination thereof.

If different ratios need to be allocated for a given wavelength selective device 82, then the signal path is switched to a second wavelength selective device 84 which has the required ratio. This may be accomplished through the use of two switches 86 which are placed before and after each of the wavelength selective devices. In normal operation, only one set of wavelength selective devices 82 is positioned between the two switches 86 and 87. The remainder of the architectural arrangement is the same as set forth above.

Figure 9B:
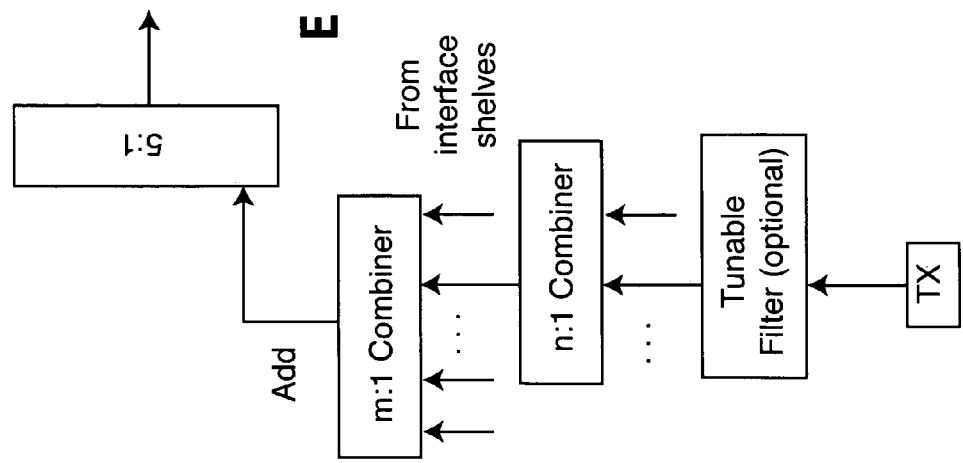
FIGS. 9A–9C illustrate an exemplary technique for adding and dropping optical sub-band signals from an optical cross-connect switch using passive splitters and combiners.
Figure 9A:
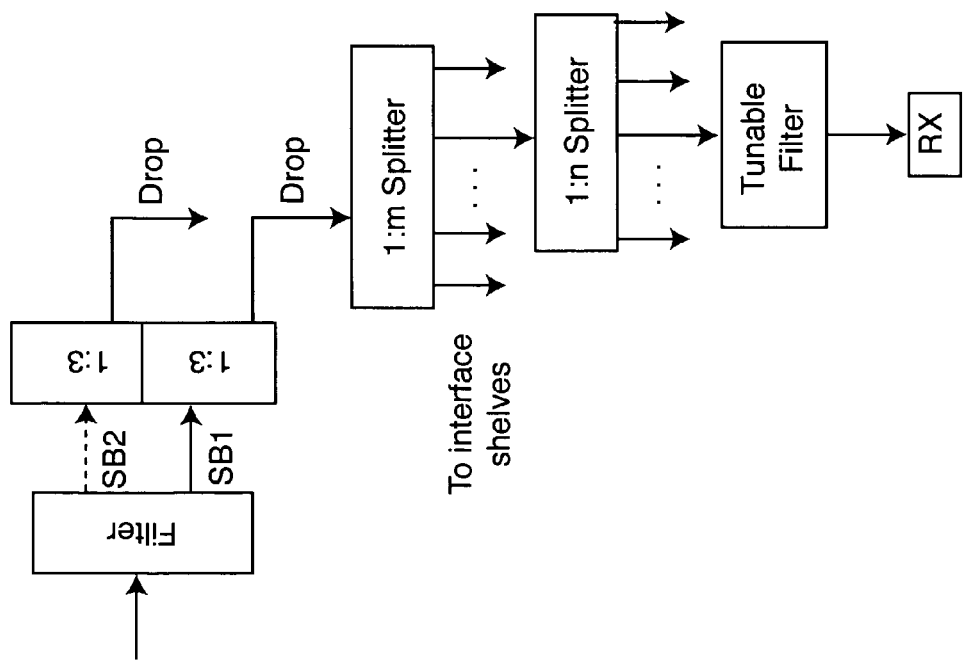
Figure 9C:
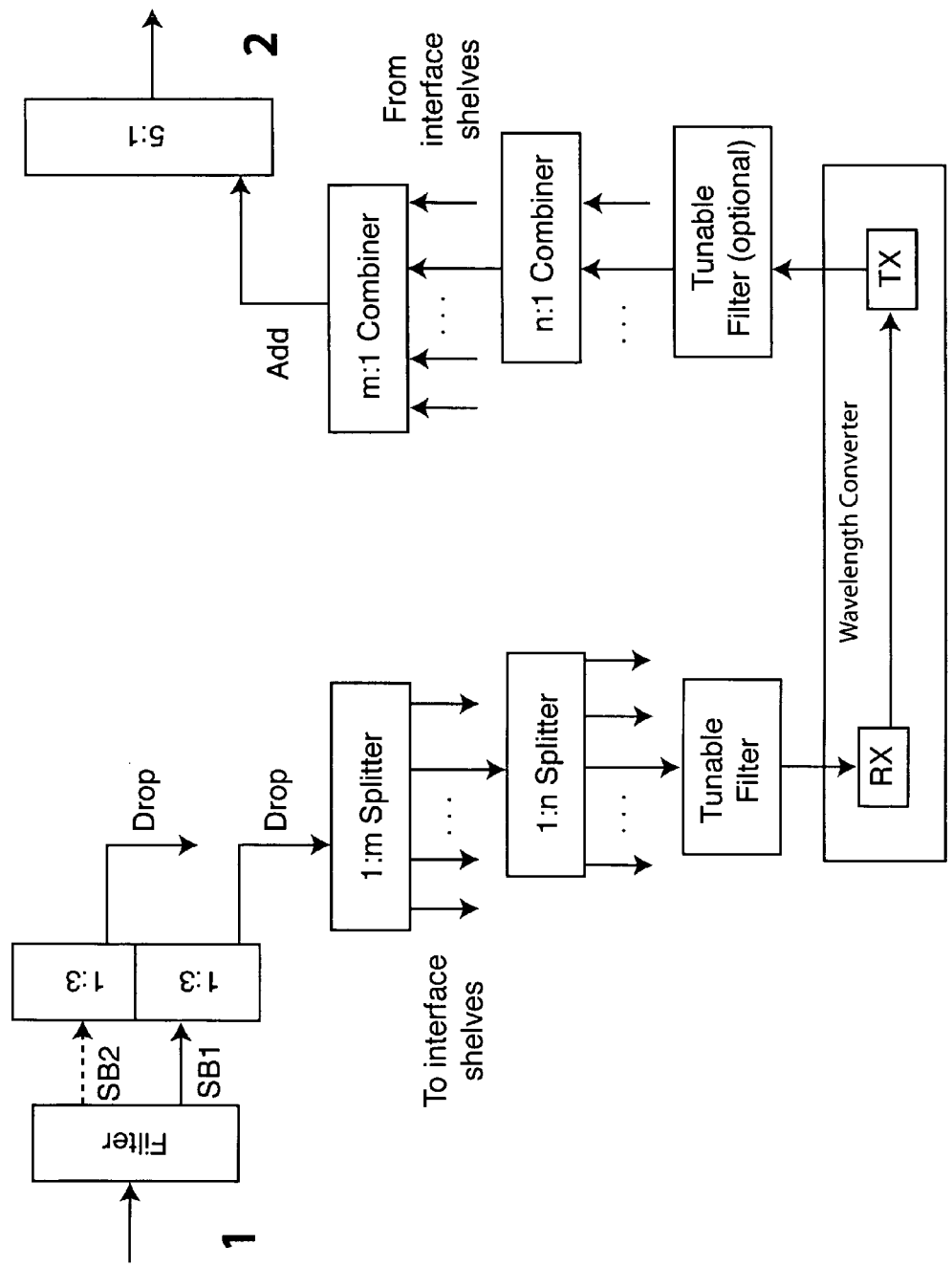

FIGS. 9A and 9B illustrate an exemplary technique for dropping and adding optical sub-band signals, respectively, using passive splitters and combiners. In this case, tunable optical filter may be optionally used to provide additional wavelength agility. With the use of passive splitters and tunable filters, multiple receivers can be tuned to receive the same optical wavelength signal from the same input fiber. In other words, this technique supports local broadcast reception.

Figure 10B:
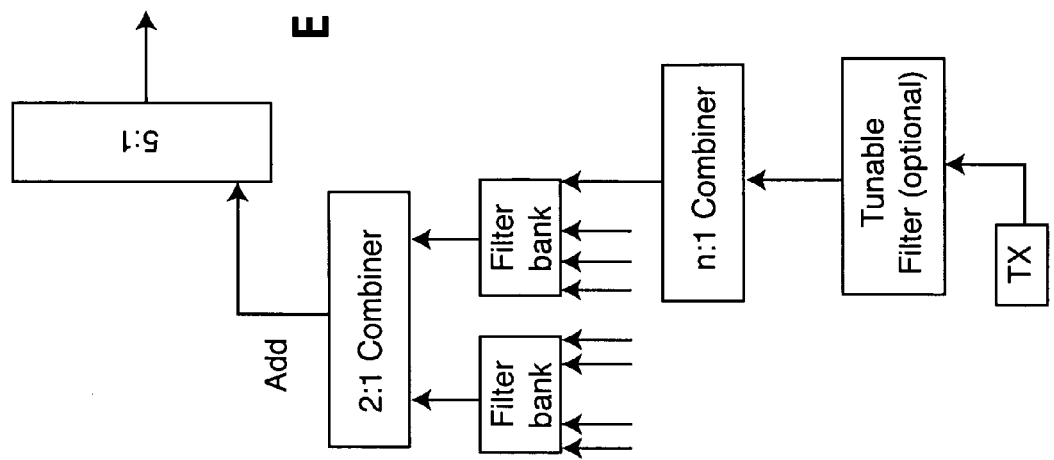
FIGS. 10A and 10B illustrate another exemplary technique for adding and dropping optical sub-band signals from an optical cross-connect switch by using a combination of splitters/combiners and filters.
Figure 10A:
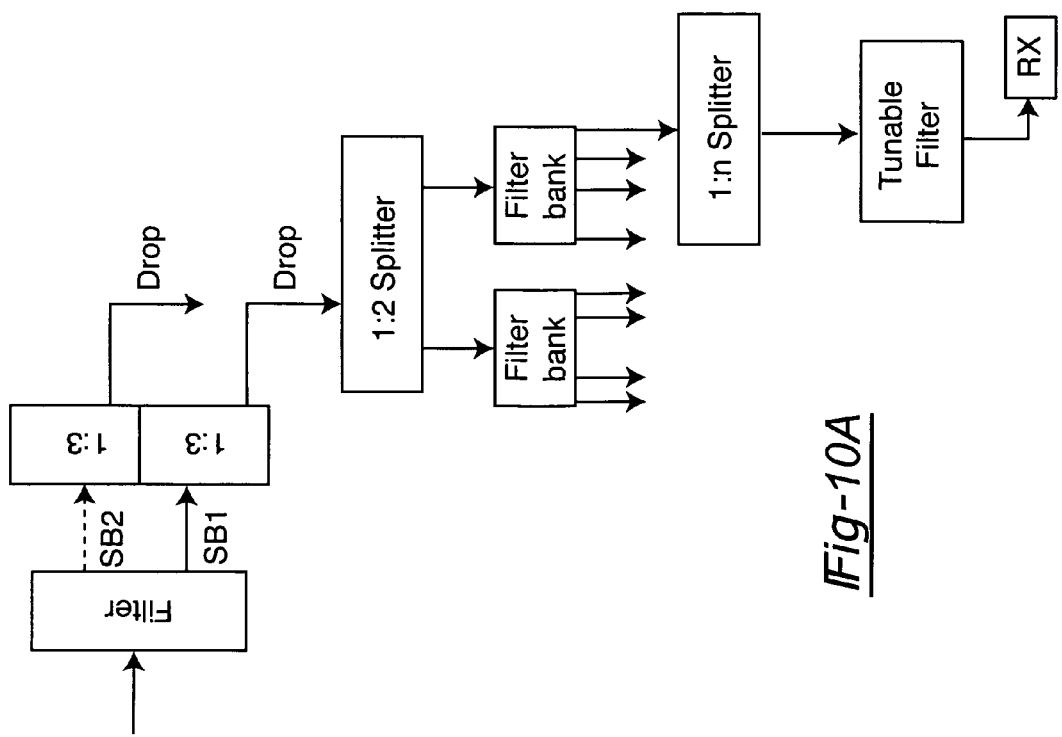

FIGS. 10A and 10B illustrate an additional technique for dropping and adding optical sub-band signals, respectively, by using a combination of splitters/combiners and filters. In this case, the filters improve the optical performance by increasing the isolation between signal channels and reducing the total loss of the signal channels as compared with the passive technique set forth above. This approach also avoids the deadband normally required between adjacent sub-bands. These two techniques are applicable to any of the arrangement set forth above.

As described above, the architectural arrangements have relied on wavelength selective devices having one or two output ports. However, it is further envisioned that wavelength selective devices having more than two output ports are also within the scope of the present invention.

Figure 11:
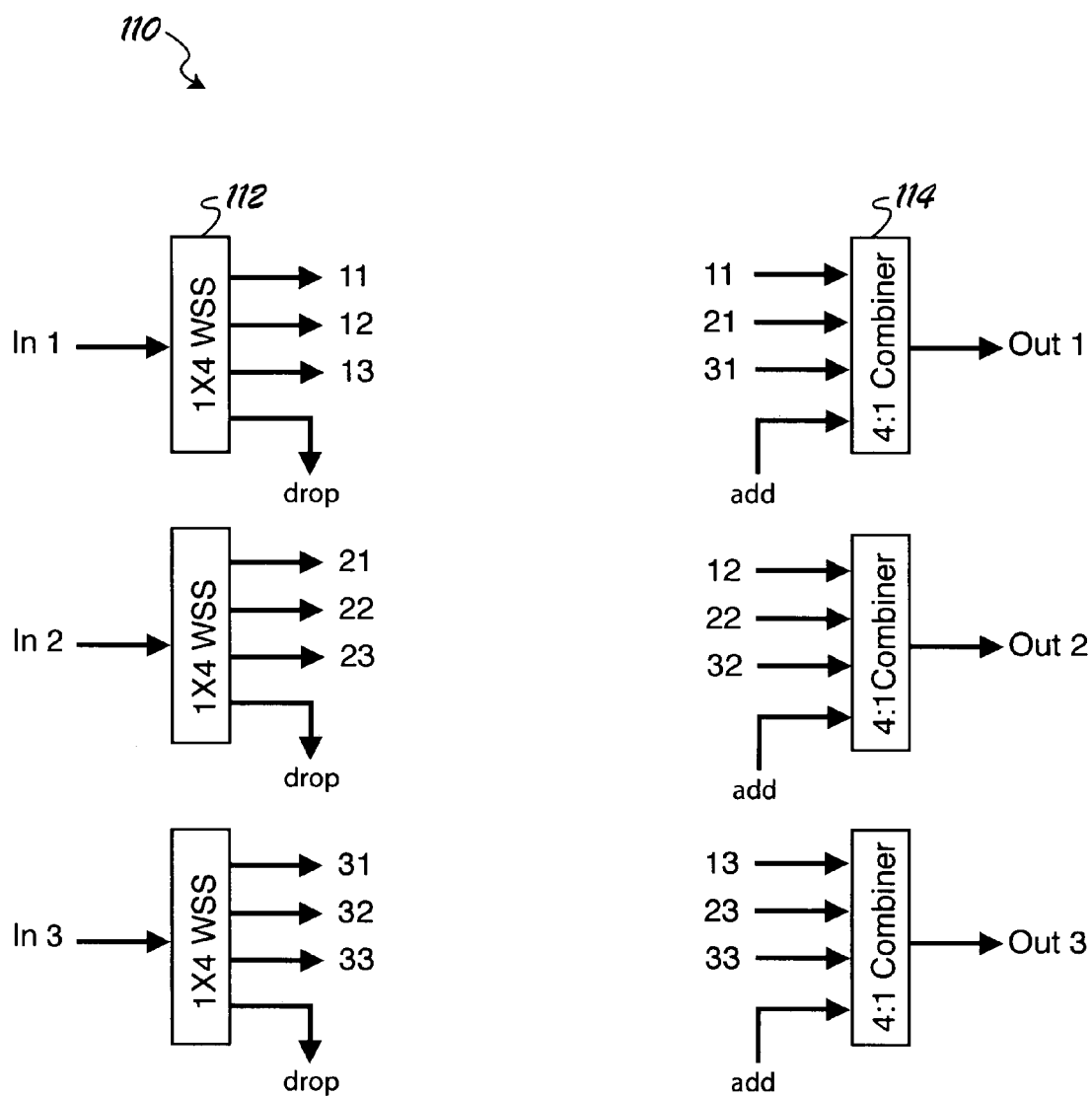
FIG. 11 is a block diagram of an architectural arrangement for an optical cross-connect switch that employs wavelength selective devices having more that two output ports in accordance with the present invention.

FIG. 11 illustrates an architectural arrangement for a three-way cross-connect switch 110 having loop-back capability. To simplify the figure, optical paths between the wavelength selective devices 112 and the signal combiners 114 are not fully drawn. Rather, each optical signal path is indicated by a two-digit number, where the first digit represents the corresponding input port and the second digit represents the corresponding output port. One output port on each wavelength selective device 112 may be used to drop the optical signal received therein. Likewise, one input port on each signal combiner 114 may be used to add an optical signal.

Figure 12:
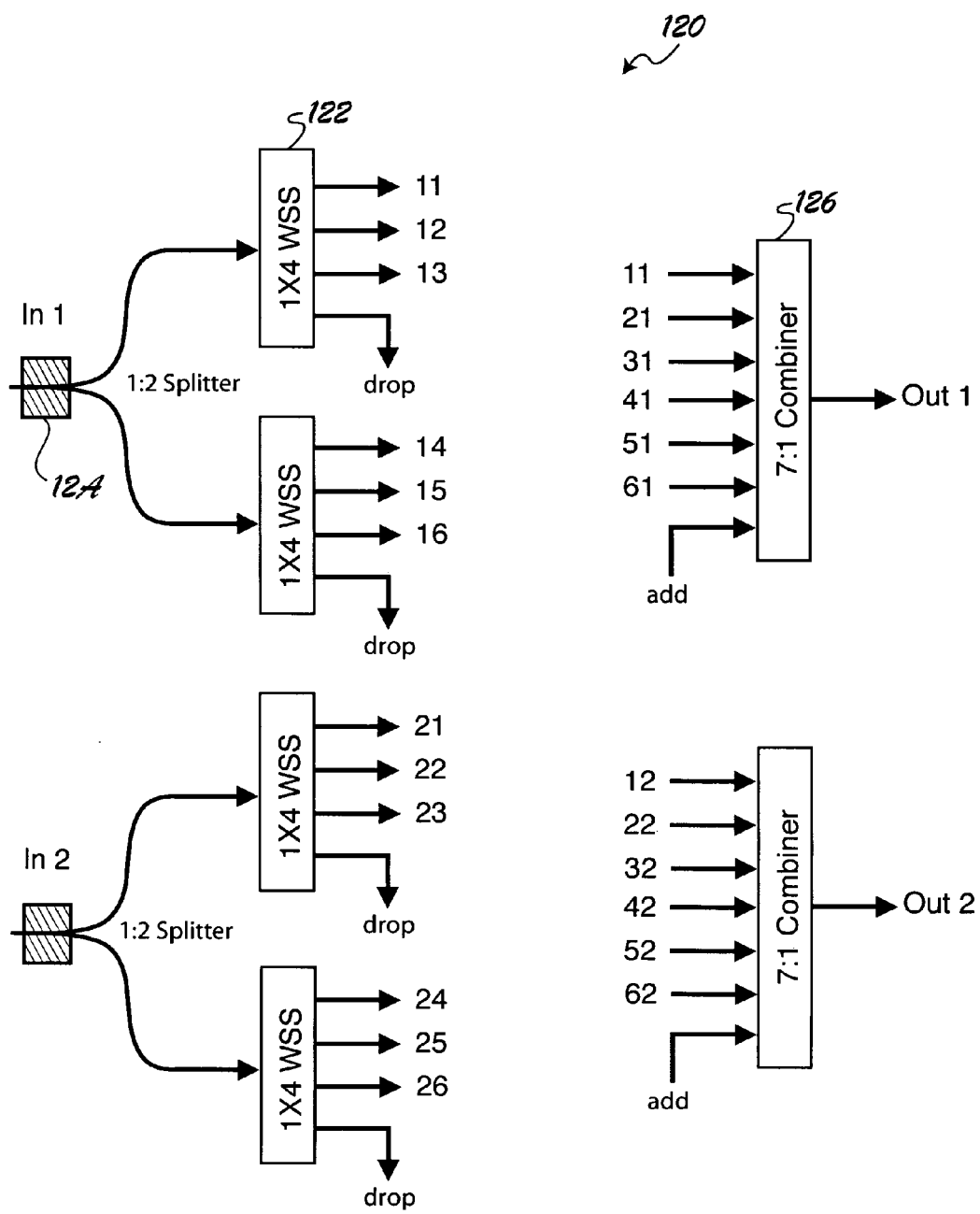
FIG. 12 is a block diagram of an alternative arrangement for an optical cross-connect switch that employs wavelength selective devices having more that two output ports in accordance with the present invention.

FIG. 12 illustrates an alternative architectural arrangement for a six-way cross-connect switch 120 having loop-back capability. In this alternative embodiment, the number of inlet ports (i.e., six) supported by the switch exceeds the number of output ports (i.e., four) supported by the wavelength selective devices 122. To accommodate the additional inlet ports, the optical signal at each inlet port is split into multiple optical signals, such that each of the optical signals is routed to a different wavelength selective device 122. Thus, the switch 120 employs twelve 1×4 wavelength selective devices. The switch 120 further employs six 1:⌈N/(M−1)⌉ signal splitters and six (N+1):1 signal combiners, where N is the number of fiber pairs supported by the cross-connect switch, M is the number of output ports supported by the wavelength selective device, and the ceiling function ⌈x⌉ is defined as the smallest integer greater or equal than x. To simplify the figure, optical connections for only two of the inlet/outlet ports are shown for the switch. The optical connection for the remaining inlet/outlet ports are made in a similar manner. It is readily understood that this arrangement is extendable to cross-connect switches without loop-back capability as well as cross-connect switches that support more or less than six inlet ports.

While the invention has been described in its presently preferred form, it will be understood that the invention is capable of modification without departing from the spirit of the invention as set forth in the appended claims.

What is claimed is:

1. An optical cross-connect switch for routing optical multiplexed signals in an optical transport network, comprising:

a plurality of signal splitters, each signal splitter having an input for receiving an optical multiplexed signal therein and a plurality of outputs, each signal splitter further operable to partition the optical multiplexed signal into a plurality of optical multiplexed signals;

a plurality of wavelength selective devices connected to the plurality of signal splitters, such that a wavelength selective device is disposed at each output of each signal splitter, each wavelength selective device receiving an optical multiplexed signal therein and operable at different wavelengths to manipulate optical data signals embodied in the optical multiplexed signal, wherein the plurality of wavelength selective devices are defined as wavelength selective switches and wavelength selective blockers arranged in a cascading manner, where the wavelength selective devices switches are connected to the outputs of the plurality of signal splitters and a plurality of wavelength selective blockers are interposed between the plurality of wavelength selective switches and the plurality of signal combiners, such that the number of wavelength selective switches is ⌈(N/2)⌉*⌈(N/2)⌉, and the number of wavelength selective blockers is N*⌈N/2⌉, where N is the number of inlet ports supported by the cross-connect switch and the ceiling function ⌈x⌉ is defined as the smallest integer greater or equal than x;

at least one of the plurality of wavelength selective devices is further defined as a wavelength selective switch having at least two inputs, a first input for receiving the optical multiplexed signal from a signal splitter and a second input for introducing an additional optical multiplexed signal into the cross-connect switch; and a plurality of signal combiners connected to the plurality of wavelength selective devices, such that each signal combiner is adapted to receive an optical multiplexed signal via a wavelength selective device from each of the plurality of signal splitters, each signal combiner operable to pass the optical multiplexed signal to an outlet port of the cross-connect switch.

2. The optical cross-connect switch of claim 1 wherein the plurality of wavelength selective devices cooperatively operate to route incoming optical multiplexed signals amongst outlet ports of the cross-connect switch.

3. The optical cross-connect switch of claim 1 wherein each of the wavelength selective device is operable to at least one of pass thru, route, or block the optical multiplexed signal received therein.

4. The optical cross-connect switch of claim 1 wherein each signal splitter is connected to at least one wavelength selective switch, thereby providing signal add/drop capability.

5. The optical cross-connect switch of claim 4 wherein each signal splitter is connected to at least two wavelength selective switches, thereby providing redundant signal add/drop capability.

6. The optical cross-connect switch of claim 1 wherein the at least one wavelength selective switch having at least two outputs, a first output connected to a signal combiner and a second output for dropping one or more optical data signals embodied in the optical multiplexed signal from the switch.

7. An optical cross-connect switch for routing optical multiplexed signals in an optical transport network, comprising:
a plurality of inlet ports, each inlet port receiving an optical multiplexed signal therein;
a plurality of signal splitters connected to the plurality of inlet ports, each signal splitter receiving an optical multiplexed signal from one of the plurality of inlet ports and operable to partition the optical multiplexed signal into a plurality of optical multiplexed signals;
a plurality of wavelength selective devices connected to the plurality of signal splitters, each wavelength selective device receiving an optical multiplexed signal from a signal splitter and operable to manipulate optical data signals that are transmitted at different wavelengths and embodied in the optical multiplexed signal; and
a plurality of signal combiners connected to the plurality of wavelength selective devices, such that each signal combiner is adapted to receive an optical multiplexed signal via a wavelength selective device from each of the plurality of inlet ports, with the exception of a complementary inlet port; and
a plurality of outlet ports, each outlet port receiving an optical multiplexed signal from one of the plurality of signal combiners wherein the plurality of wavelength selective devices are defined as wavelength selective switches and wavelength selective blockers arranged in a cascading manner, such that a plurality of wavelength selective switches are connected to the outputs of the plurality of signal splitters and a plurality of wavelength selective blockers are interposed between the plurality of wavelength selective switches and the plurality of signal combiners, such that the number of wavelength selective switches is $\lceil (N/2) \rceil * \lceil (N/2)-1 \rceil$, and the number of wavelength selective blockers is $N*(N/2)$ for an even number of inlet ports and $((N+1)*(N/2))-1$ for odd number of inlet ports, where N is the number of inlet ports supported by the cross-connect switch and the ceiling function $\lceil x \rceil$ is defined as the smallest integer greater or equal than x.

8. The optical cross-connect switch of claim 7 wherein the plurality of wavelength selective devices cooperatively operate to route incoming optical multiplexed signals amongst the plurality of outlet ports of the cross-connect switch.

9. The optical cross-connect switch of claim 7 wherein the plurality of wavelength selective devices are further defined as either wavelength selective blockers, wavelength selective switches or a combination thereof.

10. The optical cross-connect switch of claim 7 wherein each signal splitter includes a number of outputs that corresponds to the number of outlet ports, such that at least one of the outputs for the signal splitter is adapted to drop the optical multiplexed signal from the optical transport network.

11. The optical cross-connect switch of claim 7 wherein each signal combiner includes a number of inputs that corresponds to the number of inlet ports, such that at least one of the inputs to the signal combiner is adapted to add an additional optical multiplexed signal into the optical transport network.

12. The optical cross-connect switch of claim 7 wherein each signal combiner is adapted to receive an optical multiplexed signal from each of the plurality of inlet ports, including a complementary inlet port, thereby supporting loop-back capability.

* * * * *